(12) United States Patent
Chen et al.

(10) Patent No.: US 12,412,848 B2
(45) Date of Patent: Sep. 9, 2025

(54) PHYSICAL UNCLONABLE FUNCTION GENERATOR AND MANUFACTURING METHOD THEREOF

(71) Applicant: United Microelectronics Corp., Hsinchu (TW)

(72) Inventors: Po Hsien Chen, Tainan (TW); Ping-Chia Shih, Tainan (TW); Che Hao Kuo, Tainan (TW); Chia-Min Hung, Tainan (TW); Ching-Hua Yeh, Tainan (TW); Wan-Chun Liao, Hsinchu County (TW)

(73) Assignee: United Microelectronics Corp., Hsinchu (TW)

( * ) Notice: Subject to any disclaimer, the term of this patent is extended or adjusted under 35 U.S.C. 154(b) by 575 days.

(21) Appl. No.: 17/874,299

(22) Filed: Jul. 27, 2022

(65) Prior Publication Data

US 2024/0006345 A1    Jan. 4, 2024

(51) Int. Cl.
*H01L 23/00*    (2006.01)
*H04L 9/32*     (2006.01)
*H10D 62/10*    (2025.01)

(52) U.S. Cl.
CPC ............ *H01L 23/57* (2013.01); *H04L 9/3278* (2013.01); *H10D 62/115* (2025.01)

(58) Field of Classification Search
CPC . H04L 9/0866; H04L 9/3278; H04L 2209/12; H01L 23/57; H01L 21/0337; H01L 21/28238; H01L 21/02238; H01L 21/31105; H01L 21/02255; H10D 62/115; H10D 64/513; H10D 30/60; H10D 30/6892; H10D 84/811; H10B 12/488; H10B 12/34; H10B 12/053; H10B 12/315; H10B 43/27; H10B 41/50; H10B 41/49; H10B 41/27
See application file for complete search history.

(56) References Cited

U.S. PATENT DOCUMENTS

| | | | | |
|---|---|---|---|---|
| 6,420,226 B1 * | 7/2002 | Chen | ...................... | H10B 10/00 |
| | | | | 257/E27.098 |
| 6,492,224 B1 * | 12/2002 | Jao | ...................... | H10D 84/811 |
| | | | | 257/E21.548 |
| 6,569,732 B1 * | 5/2003 | Chiang | ................... | H10D 1/68 |
| | | | | 257/E27.098 |
| 9,105,748 B1 * | 8/2015 | Perera | ................... | H10B 41/48 |
| 11,282,799 B2 | 3/2022 | Wang et al. | | |
| 11,366,604 B1 | 6/2022 | Chang et al. | | |

(Continued)

*Primary Examiner* — Mouloucoulaye Inoussa
(74) *Attorney, Agent, or Firm* — JCIPRNET

(57) ABSTRACT

A physical unclonable function (PUF) generator including a substrate and semiconductor units is provided. Each of the semiconductor units includes an isolation structure, a first conductive line, and a second conductive line. The isolation structure is located in the substrate. The isolation structure has a first protrusion portion and a recess. The first protrusion portion and the recess are adjacent to each other. The first conductive line is located above the first protrusion portion and the recess. The second conductive line is located above the first conductive line. At least one short circuit randomly exists between at least one of the first conductive lines and at least one of the second conductive lines in at least one of the semiconductor units.

20 Claims, 17 Drawing Sheets

(56) References Cited

U.S. PATENT DOCUMENTS

| | | | |
|---|---|---|---|
| 2002/0057803 A1* | 5/2002 | Loos | H04L 67/568 |
| | | | 709/227 |
| 2003/0060017 A1* | 3/2003 | Okada | H10D 1/68 |
| | | | 438/386 |
| 2004/0077176 A1* | 4/2004 | Lin | H01L 21/76224 |
| | | | 257/E21.546 |
| 2004/0108533 A1* | 6/2004 | Chen | H10B 12/0387 |
| | | | 257/296 |
| 2006/0057803 A1* | 3/2006 | Chiang | H10B 12/0387 |
| | | | 438/389 |
| 2013/0105912 A1* | 5/2013 | Hsu | H10D 84/811 |
| | | | 257/E21.616 |
| 2016/0064396 A1* | 3/2016 | Liu | H10B 41/30 |
| | | | 438/264 |
| 2016/0330023 A1 | 11/2016 | Tanamoto et al. | |
| 2019/0319037 A1* | 10/2019 | Liu | H01L 21/76237 |
| 2019/0326434 A1* | 10/2019 | Sekikawa | H01L 21/0337 |
| 2021/0126098 A1* | 4/2021 | Lee | H10B 12/488 |
| 2021/0335782 A1* | 10/2021 | Lin | H10D 84/0144 |
| 2022/0285344 A1* | 9/2022 | Chuang | H10D 84/0144 |
| 2022/0320130 A1* | 10/2022 | Lin | H10B 43/27 |
| 2022/0406771 A1* | 12/2022 | Lee | H10D 84/038 |
| 2023/0126267 A1* | 4/2023 | Zhang | H10D 84/834 |
| | | | 257/401 |
| 2023/0260827 A1 | 8/2023 | Shih et al. | |
| 2024/0006345 A1 | 1/2024 | Chen et al. | |
| 2025/0017003 A1 | 1/2025 | Chen et al. | |
| 2025/0054880 A1 | 2/2025 | Lin et al. | |

* cited by examiner

PHYSICAL UNCLONABLE FUNCTION GENERATOR AND MANUFACTURING METHOD THEREOF

CROSS-REFERENCE TO RELATED APPLICATION

This application claims the priority benefit of Taiwan application serial no. 111124942, filed on Jul. 4, 2022. The entirety of the above-mentioned patent application is hereby incorporated by reference herein and made a part of this specification.

BACKGROUND

Technical Field

The invention relates to a semiconductor device and a manufacturing method thereof, and particularly relates to a physical unclonable function (PUF) generator and a manufacturing method thereof.

Description of Related Art

Currently, the PUF technology is widely used in security product applications. The PUF technology is a technique that can be used to create a unique random key for a physical entity (such as an integrated circuit). In general, the PUF generator utilizes the manufacturing variation of the semiconductor process to obtain a unique random code. Even with a precise process step, a semiconductor chip can be fabricated, but the above random code is almost impossible to be copied, so the PUF technology has high security.

However, how to improve the reliability of the PUF generator and reduce the manufacturing cost of the PUF generator is the goal of continuous efforts.

SUMMARY

The invention provides a PUF generator and a manufacturing method thereof, which can improve the reliability of the PUF generator and reduce the manufacturing cost of the PUF generator.

The invention provides a PUF generator, which includes a substrate and semiconductor units. Each of the semiconductor units includes an isolation structure, a first conductive line, and a second conductive line. The isolation structure is located in the substrate. The isolation structure has a first protrusion portion and a recess. The first protrusion portion and the recess are adjacent to each other. The first conductive line is located above the first protrusion portion and the recess. The second conductive line is located above the first conductive line. At least one short circuit randomly exists between at least one of the first conductive lines and at least one of the second conductive lines in at least one of the semiconductor units.

According to an embodiment of the invention, in the PUF generator, the first conductive line may be further located above a portion of the top surface of the substrate.

According to an embodiment of the invention, in the PUF generator, the first conductive line may have a second protrusion portion. The second protrusion portion may be located directly above the first protrusion portion.

According to an embodiment of the invention, in the PUF generator, the second protrusion portion of the first conductive line short-circuited with the second conductive line may be in direct contact with the second conductive line.

According to an embodiment of the invention, in the PUF generator, each of the semiconductor units may further include a dielectric layer. The dielectric layer is located between the first conductive line and the isolation structure.

According to an embodiment of the invention, in the PUF generator, the first conductive lines in the semiconductor units may be separated from each other.

According to an embodiment of the invention, in the PUF generator, the second conductive lines in the semiconductor units may be separated from each other.

According to an embodiment of the invention, in the PUF generator, the top surface of the first protrusion portion may be higher than the top surface of the substrate.

The invention provides a manufacturing method of a PUF generator, which includes the following steps. A substrate is provided. Semiconductor units are formed. Each of the semiconductor units includes an isolation structure, a first conductive line, and a second conductive line. The isolation structure is located in the substrate. The isolation structure has a first protrusion portion and a recess. The first protrusion portion and the recess are adjacent to each other. The first conductive line is located above the first protrusion portion and the recess. The second conductive line is located above the first conductive line. At least one short circuit randomly exists between at least one of the first conductive lines and at least one of the second conductive lines in at least one of the semiconductor units.

According to an embodiment of the invention, in the manufacturing method of the PUF generator, the first conductive line may have a second protrusion portion. The second protrusion portion may be located directly above the first protrusion portion.

According to an embodiment of the invention, in the manufacturing method of the PUF generator, the method of forming the first protrusion portion and the recess may include the following steps. A patterned mask layer is formed on the isolation structure. A portion of the isolation structure is removed to form the first protrusion portion and the recess by using the patterned mask layer as a mask.

According to an embodiment of the invention, in the manufacturing method of the PUF generator, the patterned mask layer may be a patterned hard mask layer or a patterned photoresist layer.

According to an embodiment of the invention, in the manufacturing method of the PUF generator, the patterned mask layer may be the patterned hard mask layer, and the method of forming the patterned mask layer may include performing a deposition process, a lithography process, and an etching process.

According to an embodiment of the invention, in the manufacturing method of the PUF generator, the patterned mask layer may be the patterned photoresist layer, and the method of forming the patterned mask layer may include performing a lithography process.

According to an embodiment of the invention, in the manufacturing method of the PUF generator, the method of removing the portion of the isolation structure is, for example, a wet etching method.

According to an embodiment of the invention, in the manufacturing method of the PUF generator, the method of forming the first protrusion portion and the recess may include the following steps. A patterned photoresist layer is formed on the isolation structure. An ion implantation process is performed on the isolation structure to form an implantation region and a non-implantation region in the isolation structure by using the patterned photoresist layer as a mask. The patterned photoresist layer is removed. An etching process is performed on the isolation structure to form the first protrusion portion and the recess. In the etching process, the etching rate of the isolation structure in the implantation region may be less than the etching rate of the isolation structure in the non-implantation region.

According to an embodiment of the invention, in the manufacturing method of the PUF generator, the etching process is, for example, a wet etching process.

According to an embodiment of the invention, in the manufacturing method of the PUF generator, the method of forming the first protrusion portion and the recess may include the following steps. A patterned photoresist layer is formed on the isolation structure. An ion implantation process is performed on the isolation structure to form an implantation region and a non-implantation region in the isolation structure by using the patterned photoresist layer as a mask. The patterned photoresist layer is removed. An etching process is performed on the isolation structure to form the first protrusion portion and the recess. In the etching process, the etching rate of the isolation structure in the implantation region may be greater than the etching rate of the isolation structure in the non-implantation region.

According to an embodiment of the invention, in the manufacturing method of the PUF generator, the etching process is, for example, a wet etching process.

According to an embodiment of the invention, the manufacturing method of the PUF generator may further include the following step. A dielectric layer is formed between the first conductive line and the isolation structure.

Based on the above description, in the PUF generator and the manufacturing method thereof according to the invention, the first conductive line is located above the first protrusion portion and the recess of the isolation structure, the second conductive line is located above the first conductive line, and at least one short circuit randomly exists between at least one of the first conductive lines and at least one of the second conductive lines in at least one of the semiconductor units. In this way, a random code can be generated by at least one short circuit randomly existing between at least one of the first conductive lines and at least one of the second conductive lines in at least one of the semiconductor units, thereby improving the reliability of the PUF generator and reducing the manufacturing cost of the PUF generator.

In order to make the aforementioned and other objects, features and advantages of the invention comprehensible, several exemplary embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The embodiments are described in detail below with reference to the accompanying drawings, but the embodiments are not intended to limit the scope of the invention. For the sake of easy understanding, the same components in the following description will be denoted by the same reference symbols. In addition, the drawings are for illustrative purposes only and are not drawn to the original dimensions. Furthermore, the features in the top view and the features in the cross-sectional view are not drawn to the same scale. In fact, the dimensions of the various features may be arbitrarily increased or reduced for clarity of discussion.

FIG. 1A to FIG. 1F are cross-sectional views illustrating a manufacturing process of a PUF generator according to some embodiments of the invention. FIG. 1G is a cross-sectional view illustrating a PUF generator according to some embodiments of the invention. FIG. 2 is a top view illustrating a PUF generator according to some embodiments of the invention. FIG. 1A to FIG. 1G are cross-sectional views taken along section line I-I' in FIG. 2. In the top view of the present embodiment, some components in the cross-sectional view are omitted to clearly illustrate the configuration relationship between the components in the top view. FIG. 3 is a top view illustrating a PUF circuit according to some embodiments of the invention.

Figure 1A:
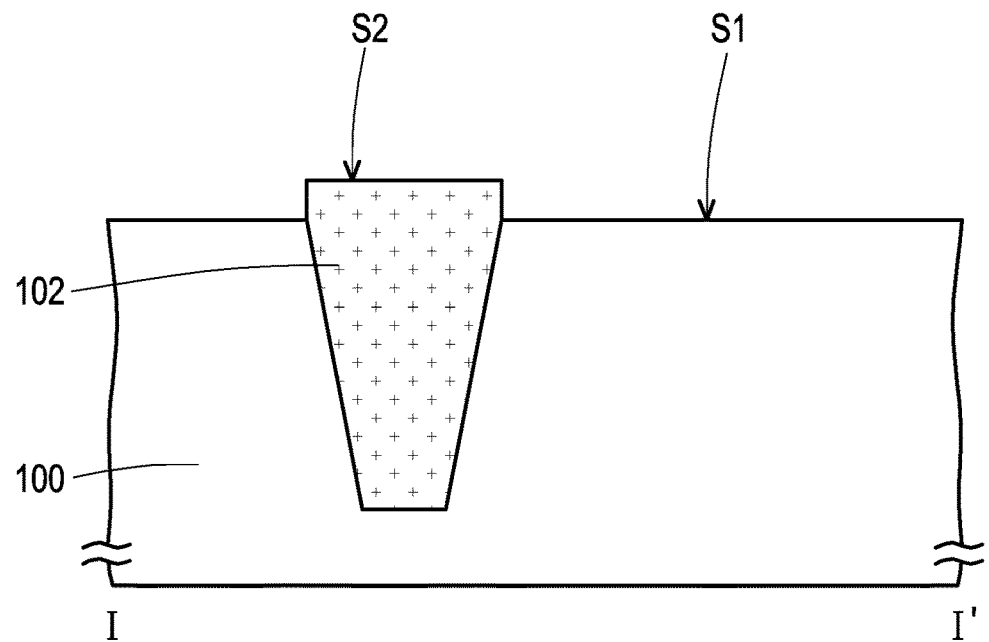
FIG. 1A to FIG. 1F are cross-sectional views illustrating a manufacturing process of a PUF generator according to some embodiments of the invention.
Figure 2:
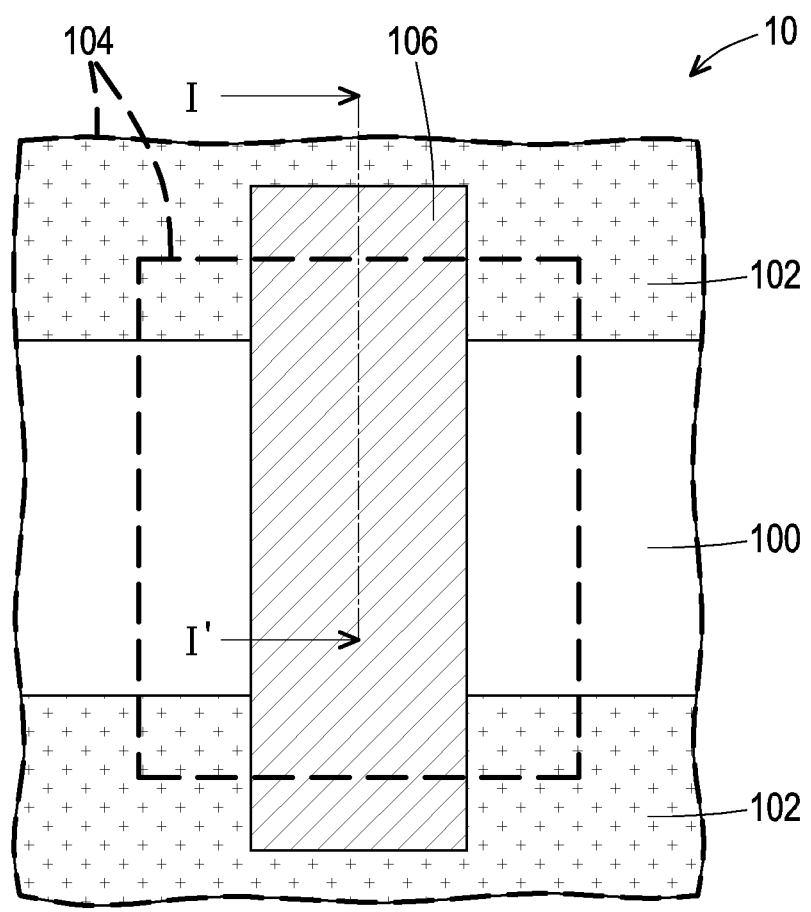
FIG. 2 is a top view illustrating a PUF generator according to some embodiments of the invention.
Figure 3:
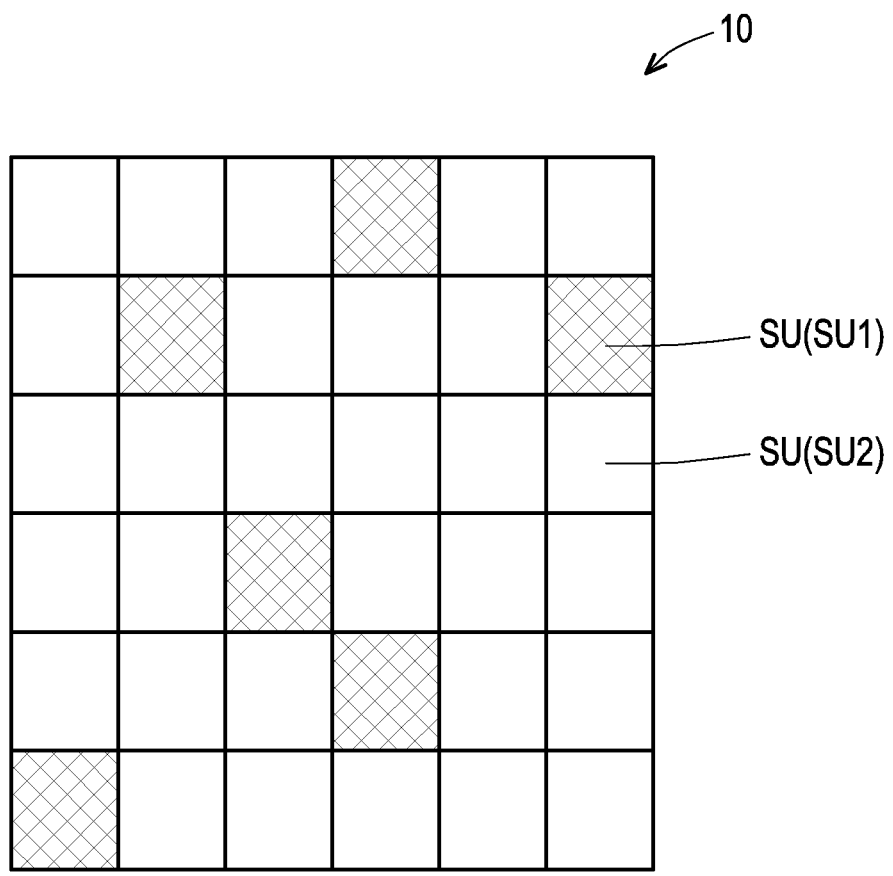
FIG. 3 is a top view illustrating a PUF circuit according to some embodiments of the invention.

Referring to FIG. 1A and FIG. 2, a substrate 100 is provided. The substrate 100 may be a semiconductor substrate such as a silicon substrate. Furthermore, an isolation structure 102 may be formed in the substrate 100. In some embodiments, the top surface S2 of the isolation structure 102 may be higher than the top surface S1 of the substrate 100. The isolation structure 102 is, for example, a shallow trench isolation (STI) structure. The material of the isolation structure 102 is, for example, silicon oxide.

Figure 1B:
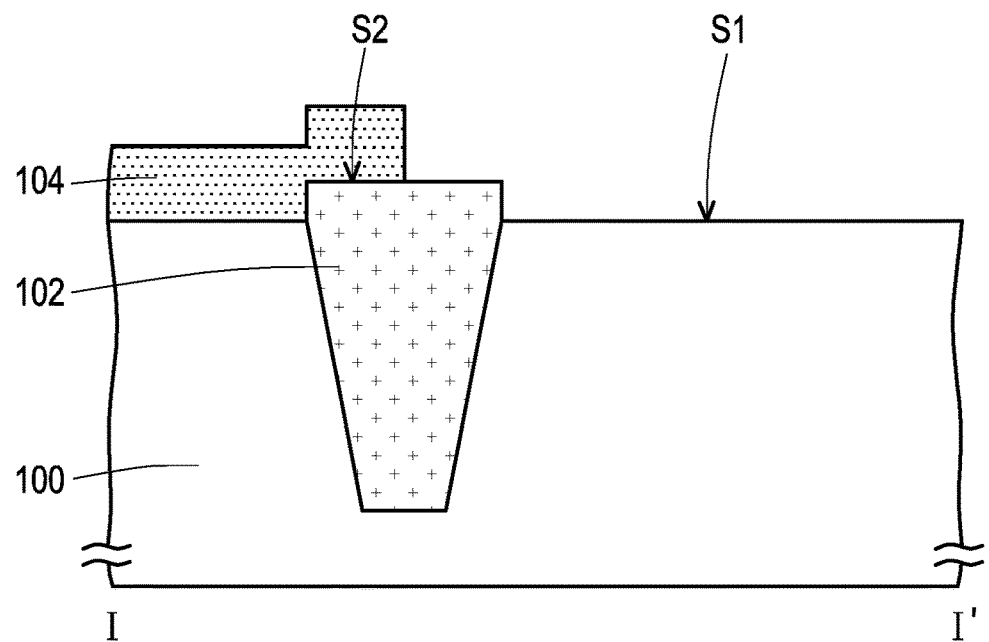

Referring to FIG. 1B and FIG. 2, a patterned mask layer 104 may be formed on the isolation structure 102. The patterned mask layer 104 may expose a portion of the isolation structure 102. The patterned mask layer 104 may be a patterned hard mask layer or a patterned photoresist layer. In the present embodiment, the patterned mask layer 104 may be the patterned hard mask layer, and the method of forming the patterned mask layer 104 may include performing a deposition process, a lithography process, and an etching process. The material of the patterned hard mask layer is, for example, silicon nitride. In other embodiments, the patterned mask layer 104 may be the patterned photoresist layer, and the method of forming the patterned mask layer 104 may include performing a lithography process.

Figure 1C:
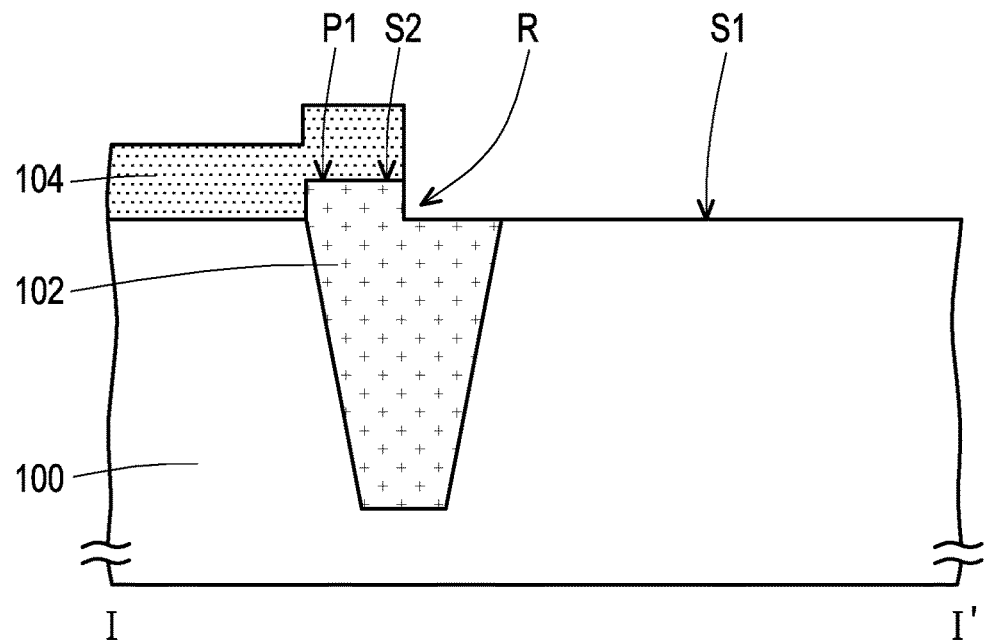

Referring to FIG. 1C and FIG. 2, a portion of the isolation structure 102 may be removed to form a protrusion portion P1 and a recess R by using the patterned mask layer 104 as a mask. The protrusion portion P1 and the recess R are adjacent to each other. The top surface S2 of the protrusion portion P1 may be higher than the top surface S1 of the substrate 100. The method of removing the portion of the isolation structure 102 is, for example, a wet etching method. For example, the portion of the isolation structure 102 may be removed by a buffered oxide etchant (BOE).

Figure 1D:
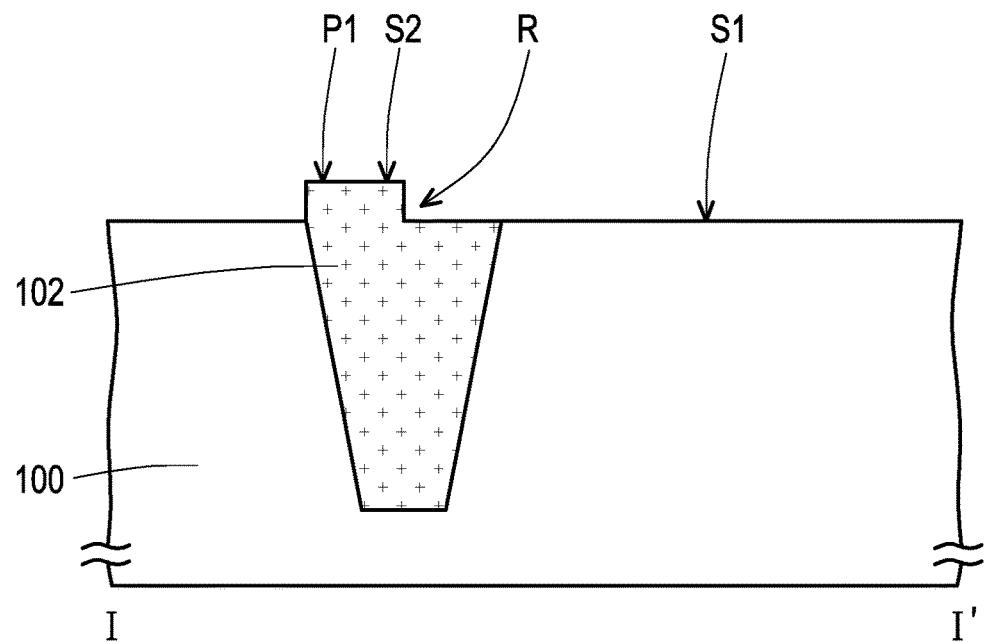

Referring to FIG. 1D and FIG. 2, the patterned mask layer 104 may be removed. In the present embodiment, the patterned mask layer 104 is, for example, the patterned hard mask layer, and the patterned mask layer 104 may be removed by an etching method. In other embodiments, when the patterned mask layer 104 is the patterned photoresist layer, the patterned mask layer 104 may be removed by a dry stripping method or a wet stripping method.

Figure 1E:
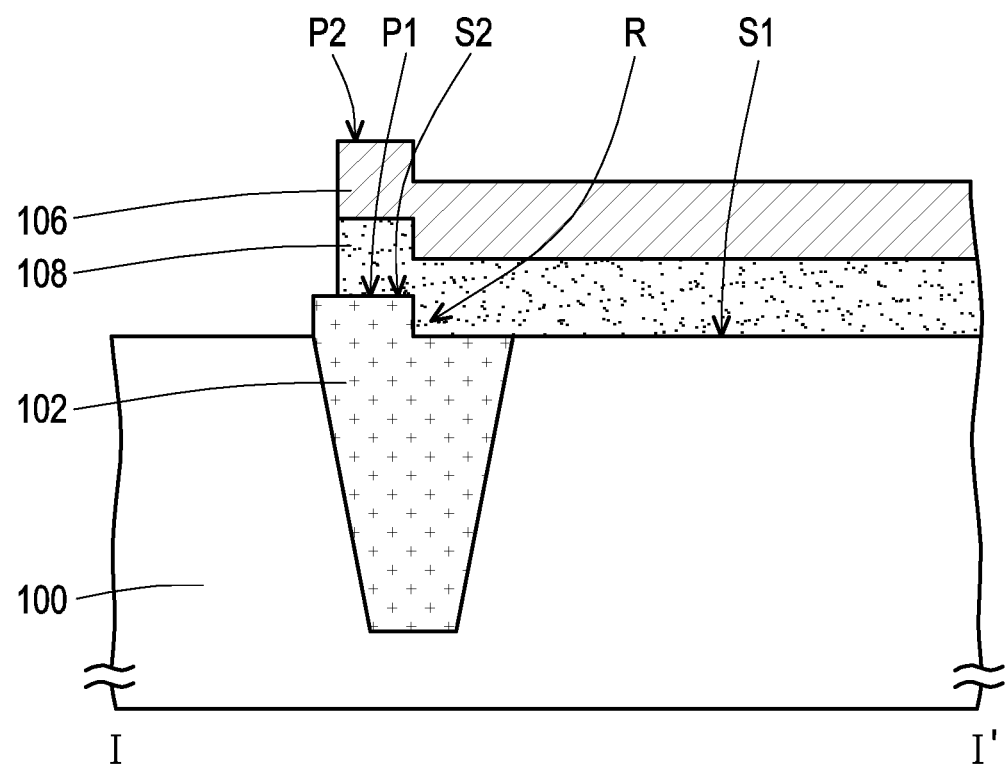

Referring to FIG. 1E and FIG. 2, a conductive line 106 may be formed above the protrusion portion P1 and the recess R. The conductive line 106 may have a protrusion portion P2. The protrusion portion P2 may be located directly above the protrusion portion P1. The conductive line 106 may be further formed over a portion of the top surface S1 of the substrate 100. The material of the conductive line 106 is, for example, doped polysilicon.

In some embodiments, a dielectric layer 108 may be formed between the conductive lines 106 and the isolation structure 102. The dielectric layer 108 may be further formed between the conductive line 106 and the substrate 100. The material of the dielectric layer 108 is, for example, silicon oxide.

In some embodiments, the method of forming the conductive line 106 and the dielectric layer 108 may include the following steps, but the invention is not limited thereto. First, a dielectric material layer (not shown) and a conductive line material layer (not shown) may be sequentially formed on the isolation structure 102 and the substrate 100. In some embodiments, the method of forming the dielectric material layer is, for example, a chemical vapor deposition (CVD) method. In some embodiments, the method of forming the conductive line material layer is, for example, a CVD method. Then, the conductive line material layer and the dielectric material layer may be patterned by a lithography process and an etching process to form the conductive line 106 and the dielectric layer 108. In some embodiments, the conductive line 106 and the gate (not shown) of the transistor device may be formed simultaneously by the same process.

In some embodiments, the protrusion portion P1 and the recess R may be located at one or two ends of the conductive line 106 according to the layout design of the patterned mask layer 104. As long as the protrusion portion P1 and the recess R are located at at least one end of the conductive line 106, it falls within the scope of the invention.

Figure 1F:
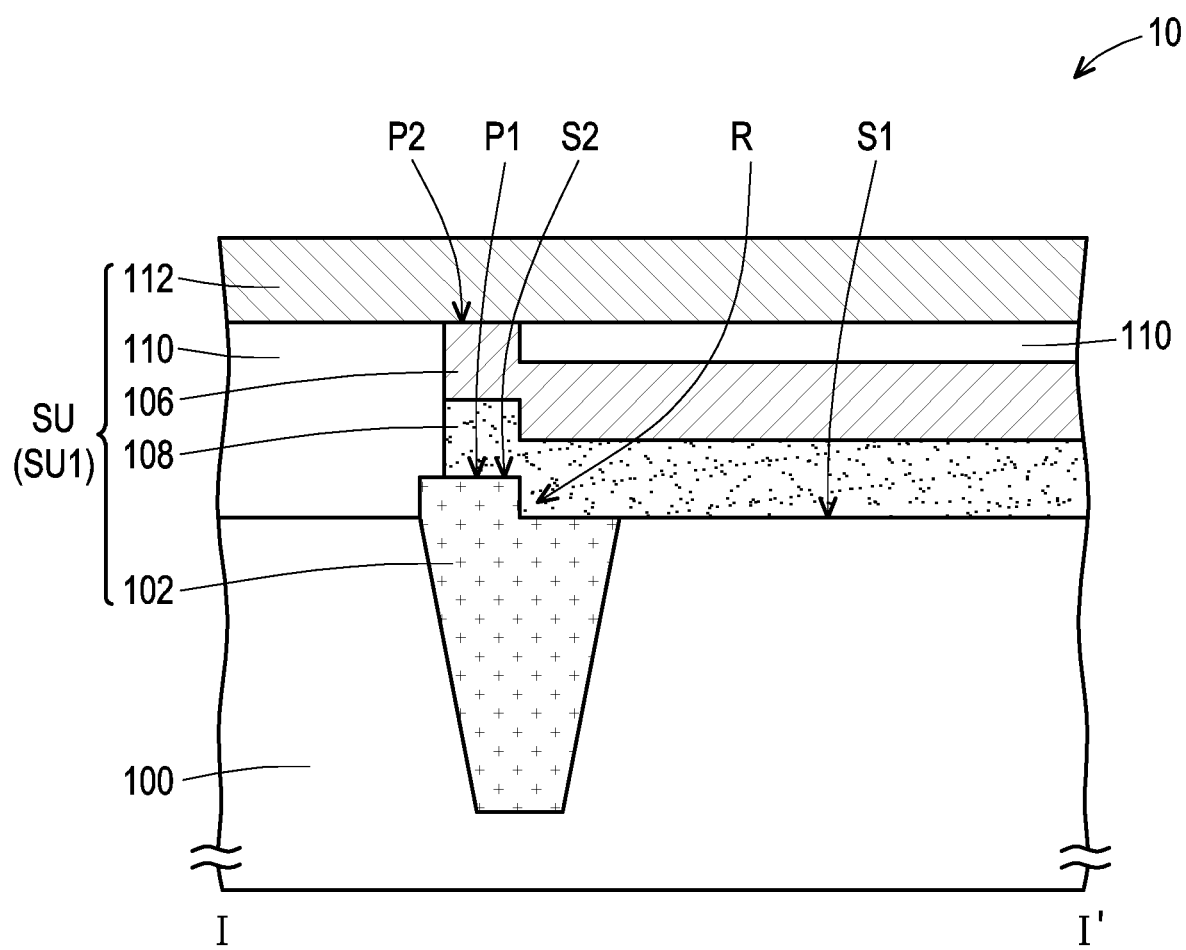
Figure 1G:
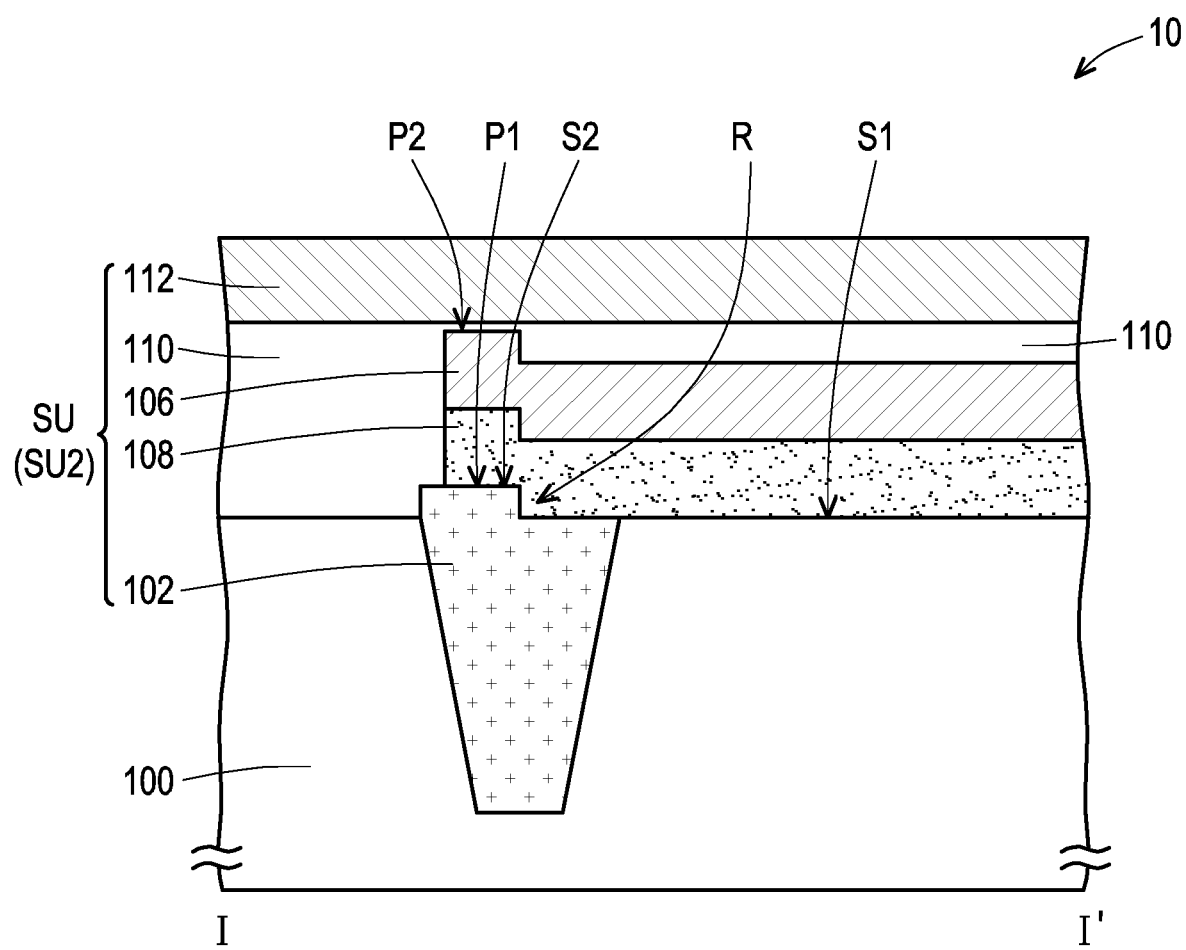
FIG. 1G is a cross-sectional view illustrating a PUF generator according to some embodiments of the invention.

Referring to FIG. 1F, a dielectric layer 110 may be formed on the substrate 100, the isolation structure 102, the conductive line 106, and the dielectric layer 108. In some embodiments, the dielectric layer 110 may expose the protrusion portion P2 of the conductive line 106. The dielectric layer 110 may be a single-layer structure or a multilayer structure. The material of the dielectric layer 110 is, for example, silicon oxide, silicon nitride, or a combination thereof. In some embodiments, the method of forming the dielectric layer 110 may include the following steps, but the invention is not limited thereto. First, a dielectric material layer (not shown) may be formed on the substrate 100, the isolation structure 102, the conductive line 106, and the dielectric layer 108. Then, a planarization process (e.g., chemical mechanical polishing (CMP) process) may be performed on the dielectric material layer to form the dielectric layer 110.

A conductive line 112 may be formed above the conductive line 106. The material of the conductive line 112 is, for example, copper. In some embodiments, the method of forming the conductive line 112 is, for example, a damascene method.

In addition, a semiconductor unit SU (e.g., semiconductor unit SU1 in FIG. 1F) may be formed by the above method. Furthermore, other semiconductor unit SU (e.g., semiconductor unit SU2 in FIG. 1G) may be formed by the above method. That is, as shown in FIG. 1F, FIG. 1G, and FIG. 3, a plurality of semiconductor units SU may be formed by the above method.

Moreover, the conductive line 112 may be electrically connected to the conductive lines 106 randomly due to the manufacturing variation of the semiconductor process. Therefore, at least one short circuit randomly exists between at least one of the conductive lines 106 and at least one of the conductive lines 112 in at least one of the semiconductor units SU. For example, when the manufacturing variation causes a height difference between the isolation structure 102 of FIG. 1F and the isolation structure 102 of FIG. 1G, the dielectric layer 110 may expose the protrusion portion P2 of the conductive line 106 in FIG. 1F and may not expose the protrusion portion P2 of the conductive line 106 in FIG. 1G. Therefore, the conductive line 112 in FIG. 1F may be electrically connected to the conductive line 106 in FIG. 1F, and the conductive line 112 in FIG. 1G may not be electrically connected to the conductive line 106 in FIG. 1G. That is, the short circuit exists between the conductive line 106 and the conductive line 112 in the semiconductor unit SU1 of FIG. 1F, and the short circuit does not exist between the conductive line 106 and the conductive line 112 in the semiconductor unit SU2 of FIG. 1G.

Hereinafter, the PUF generator 10 of the above embodiment is described with reference to FIG. 1F, FIG. 1G, and FIG. 3. In addition, although the method for forming the PUF generator 10 is described by taking the above method as an example, the invention is not limited thereto.

Referring to FIG. 1F, FIG. 1G, and FIG. 3, a PUF generator 10 includes a substrate 100 and semiconductor units SU. The PUF generator 10 can be used to generate a security key and/or an identification key. In some embodiments, as shown in FIG. 3, the PUF generator 10 may be a PUF circuit, and the semiconductor units SU may be arranged in a matrix. In some embodiments, the PUF generator 10 may include a plurality of semiconductor units SU1 and a plurality of semiconductor units SU2, but the invention is not limited thereto. As long as the semiconductor units SU includes at least one semiconductor unit SU1, it falls within the scope of the invention.

Each of the semiconductor units SU includes an isolation structure 102, a conductive line 106, and a conductive line 112. The semiconductor unit SU can be used as a bit structure for forming the random code. The isolation structure 102 is located in the substrate 100. The isolation structure 102 has a protrusion portion P1 and a recess R. The protrusion portion P1 and the recess R are adjacent to each other. The top surface S2 of the protrusion portion P1 may be higher than the top surface S1 of the substrate 100. The conductive line 106 is located above the protrusion portion P1 and the recess R. The conductive line 106 may be further located above a portion of the top surface S1 of the substrate 100. The conductive line 106 may have a protrusion portion P2. The protrusion portion P2 may be located directly above the protrusion portion P1. The conductive line 112 is located above the conductive line 106. At least one short circuit randomly exists between at least one of the conductive lines 106 and at least one of the conductive lines 112 in at least one of the semiconductor units SU. In addition, the protrusion portion P2 of the conductive line 106 short-circuited with the conductive line 112 may be in direct contact with the conductive line 112.

In some embodiments, the conductive lines 106 in the semiconductor units SU may be separated from each other. In some embodiments, the conductive lines 112 in the semiconductor units SU may be separated from each other. For example, the conductive line 106 in FIG. 1F and the conductive line 106 in FIG. 1G may be separated from each other, and the conductive line 112 in FIG. 1F and the conductive line 112 in FIG. 1G may be separated from each other.

In some embodiments, each of the semiconductor units SU may further include a dielectric layer 108. The dielectric layer 108 is located between the conductive line 106 and the isolation structure 102. In addition, the dielectric layer 108 may be further located between the conductive line 106 and the substrate 100. In some embodiments, each of the semiconductor units SU may further include a dielectric layer 110. The dielectric layer 110 may be located on the substrate 100, the isolation structure 102, the conductive line 106, and the dielectric layer 108. In FIG. 1F, the protrusion portion P2 of the conductive line 106 may pass through the dielectric layer 110 to be electrically connected to the conductive line 112. In FIG. 1G, the protrusion portion P2 of the conductive line 106 may be electrically insulated from the conductive line 112 by the dielectric layer 110.

Furthermore, the details (e.g., the material, the forming method, and the effect) of each component in the PUF generator 10 have been described in detail in the above embodiments, and the description thereof is not repeated here.

Based on the above embodiments, in the PUF generator 10 and the manufacturing method thereof, the conductive line 106 is located above the protrusion portion P1 and the recess R of the isolation structure 102, the conductive line 112 is located above the conductive line 106, and at least one short circuit randomly exists between at least one of the conductive lines 106 and at least one of the conductive lines 112 in at least one of the semiconductor units SU. In this way, a random code can be generated by at least one short circuit randomly existing between at least one of the conductive lines 106 and at least one of the conductive lines 112 in at least one of the semiconductor units SU, thereby improving the reliability of the PUF generator 10 and reducing the manufacturing cost of the PUF generator 10.

Figure 4A:
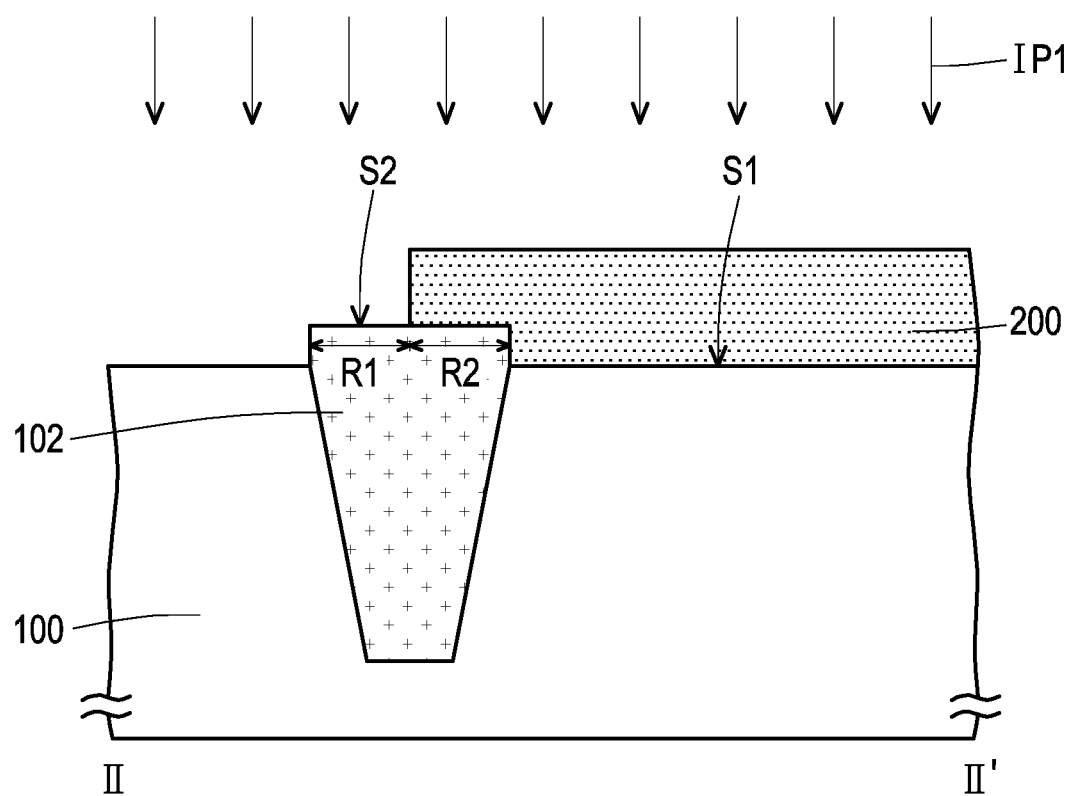
FIG. 4A to FIG. 4C are cross-sectional views illustrating a manufacturing process of a PUF generator according to other embodiments of the invention.
Figure 4B:
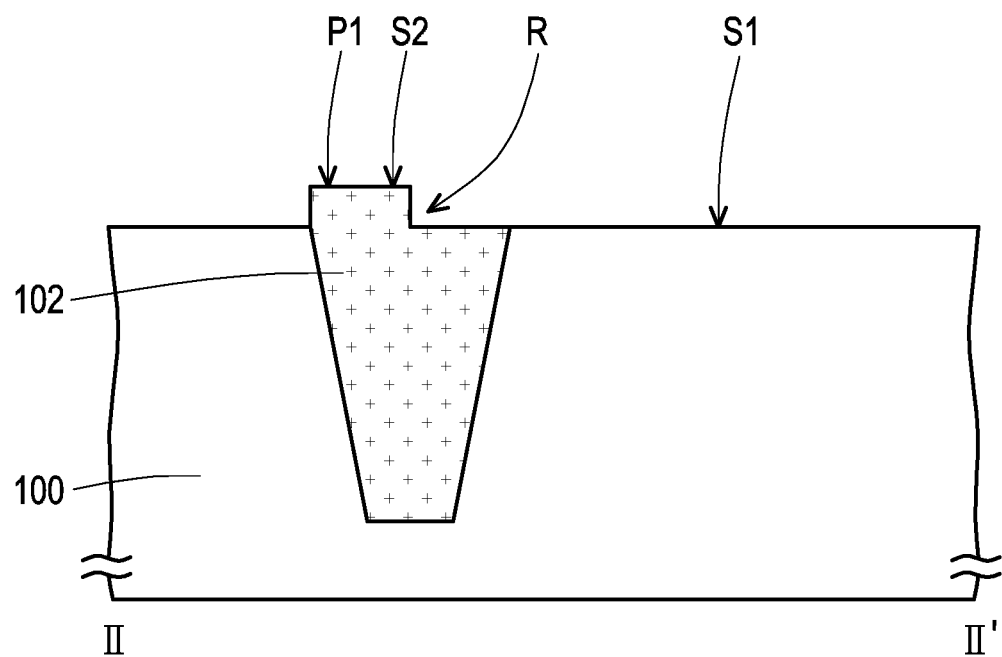
Figure 4C:
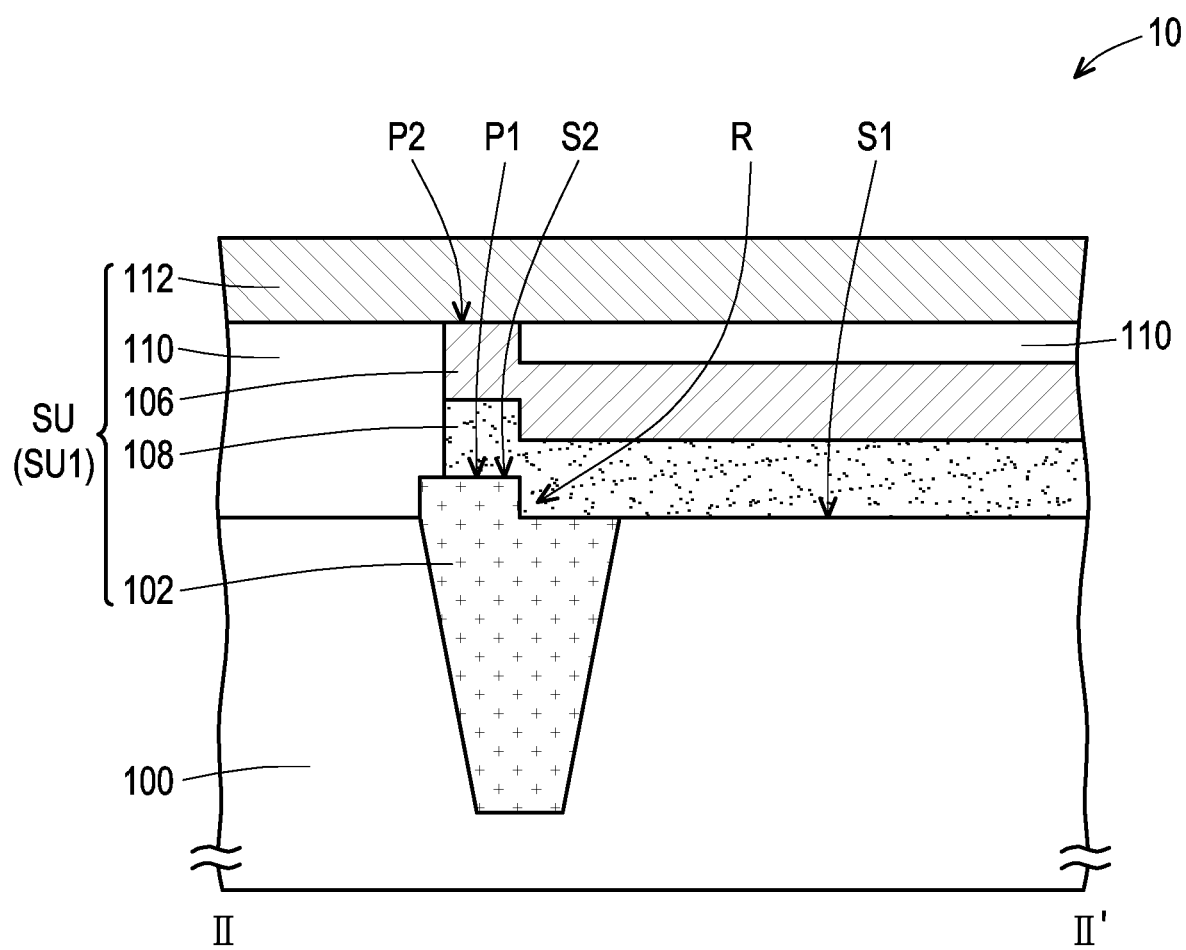
Figure 4D:
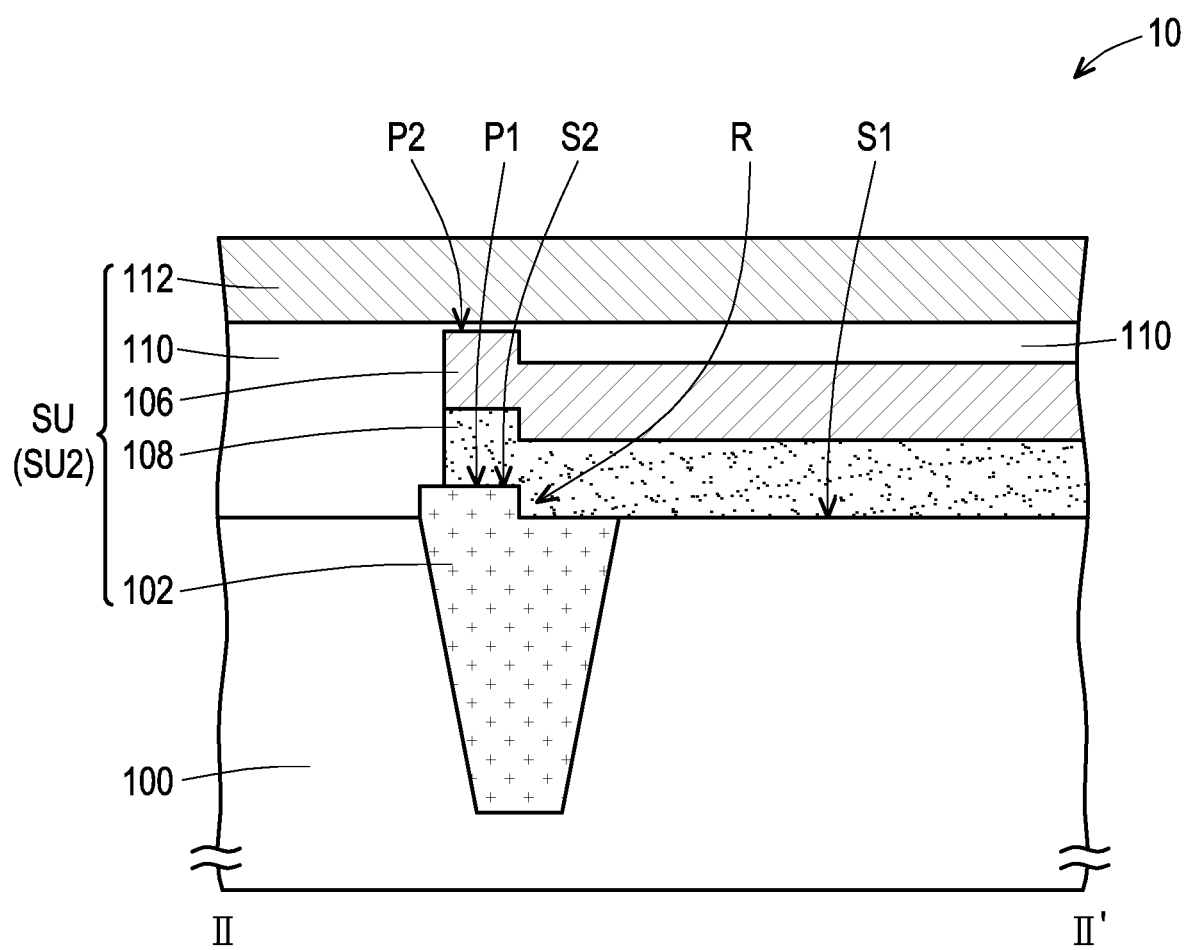
FIG. 4D is a cross-sectional view illustrating a PUF generator according to other embodiments of the invention.
Figure 5:
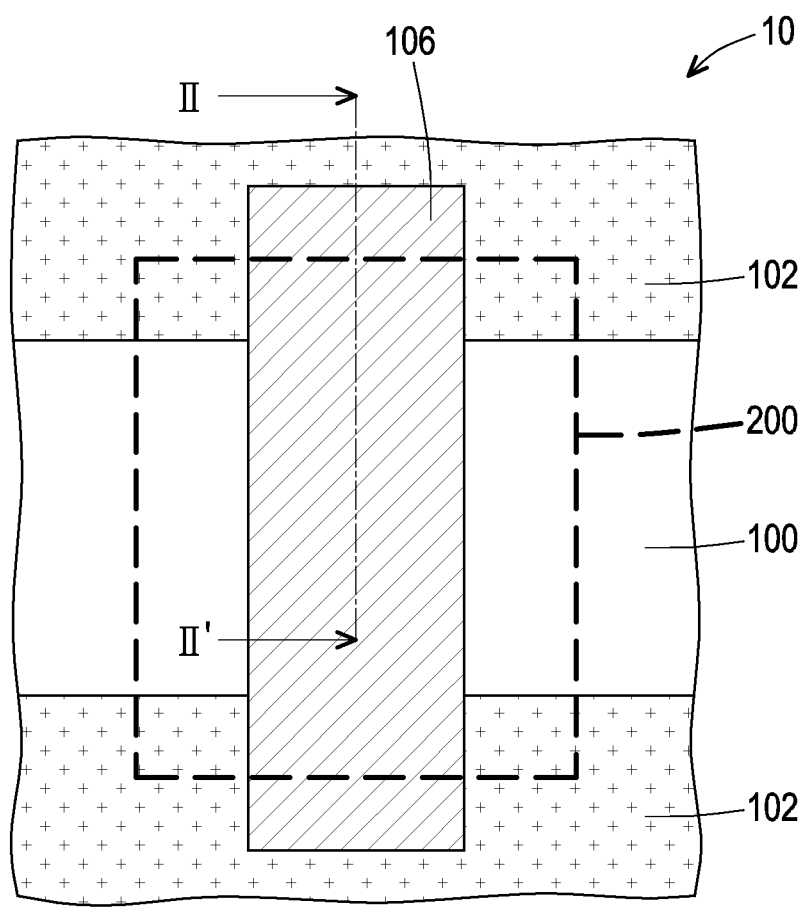
FIG. 5 is a top view illustrating a PUF generator according to other embodiments of the invention.

FIG. 4A to FIG. 4C are cross-sectional views illustrating a manufacturing process of a PUF generator according to other embodiments of the invention. FIG. 4D is a cross-sectional view illustrating a PUF generator according to other embodiments of the invention. FIG. 5 is a top view illustrating a PUF generator according to other embodiments of the invention. FIG. 4A to FIG. 4D are cross-sectional views taken along section line II-II' in FIG. 5. In the top view of the present embodiment, some components in the cross-sectional view are omitted to clearly illustrate the configuration relationship between the components in the top view.

Referring to FIG. 4A and FIG. 5, the structure as shown in FIG. 1A is provided. In addition, the structure of FIG. 1A and the manufacturing method thereof have been described in detail in the above embodiments, and the description thereof is not repeated here.

A patterned photoresist layer 200 may be formed on the isolation structure 102. The patterned photoresist layer 200 may expose a portion of the isolation structure 102. The method of forming the patterned photoresist layer 200 may include performing a lithography process.

An ion implantation process IP1 may be performed on the isolation structure 102 to form an implantation region R1 and a non-implantation region R2 in the isolation structure 102 by using the patterned photoresist layer 200 as a mask. In the subsequent etching process for the isolation structure 102, the dopant in the implantation region R1 can make the etching rate of the isolation structure 102 in the implantation region R1 less than the etching rate of the isolation structure 102 in the non-implantation region R2.

Referring to FIG. 4B and FIG. 5, the patterned photoresist layer 200 may be removed. The method of removing the patterned photoresist layer 200 is, for example, a dry stripping method or a wet stripping method.

An etching process may be performed on the isolation structure 102 to form a protrusion portion P1 and a recess R. In the etching process, the etching rate of the isolation structure 102 in the implantation region R1 (FIG. 4A) may be less than the etching rate of the isolation structure 102 in the non-implantation region R2 (FIG. 4A). In some embodiments, the etching process is, for example, a wet etching process. For example, the isolation structure 102 may be etched by a buffered oxide etchant (BOE).

Referring to FIG. 4C, after forming the protrusion portion P1 and the recess R, steps as shown in FIG. 1E and FIG. 1F may be performed to form a semiconductor unit SU (e.g., semiconductor unit SU1), and the description thereof is not repeated here. In addition, other semiconductor unit SU (e.g., semiconductor unit SU2 in FIG. 4D) may be formed by the above method. That is, as shown in FIG. 4C, FIG. 4D, and FIG. 3, a plurality of semiconductor units SU may be formed by the above method, thereby forming a PUF generator 10. Moreover, the material, the arrangement, the forming method, and the effect of each component in the PUF generator 10 have been described in detail in the above embodiments, and the description thereof is not repeated here.

Figure 6A:
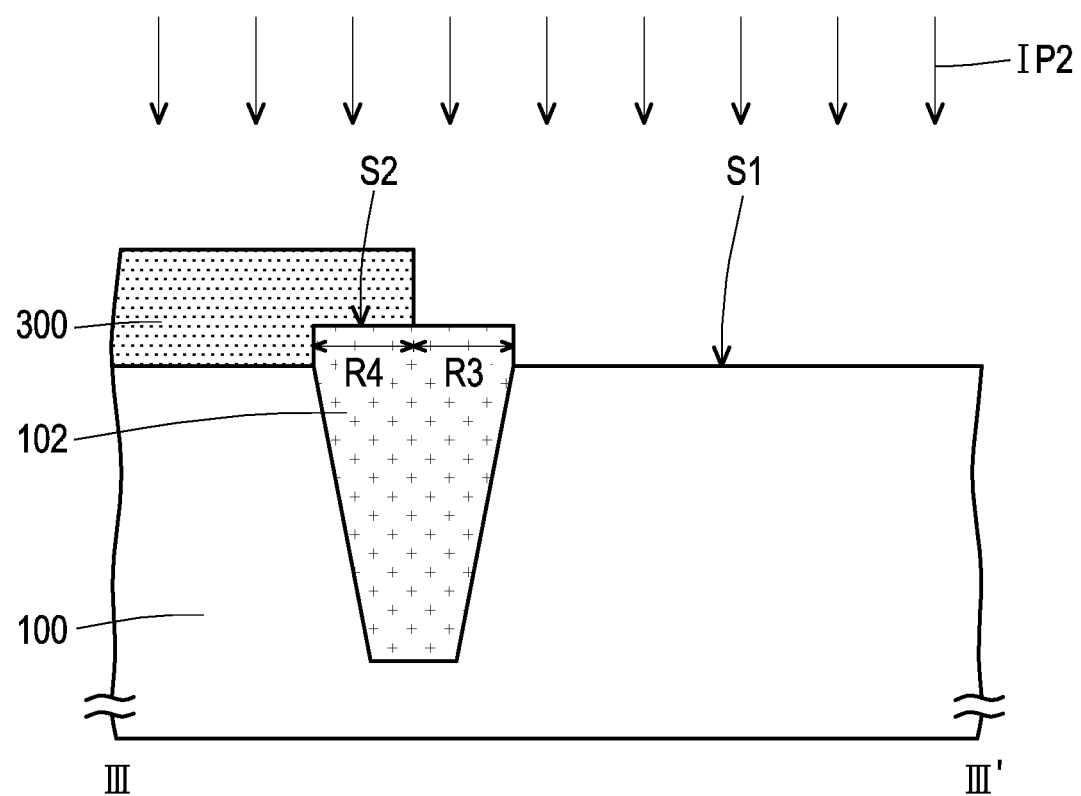
FIG. 6A to FIG. 6C are cross-sectional views illustrating a manufacturing process of a PUF generator according to other embodiments of the invention.
Figure 6B:
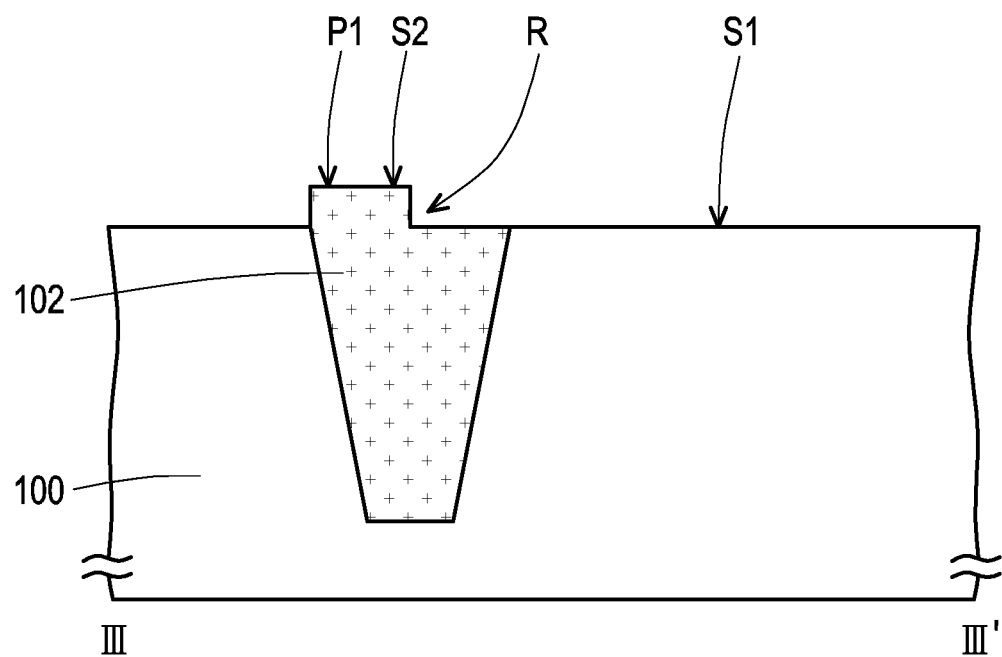
Figure 6C:
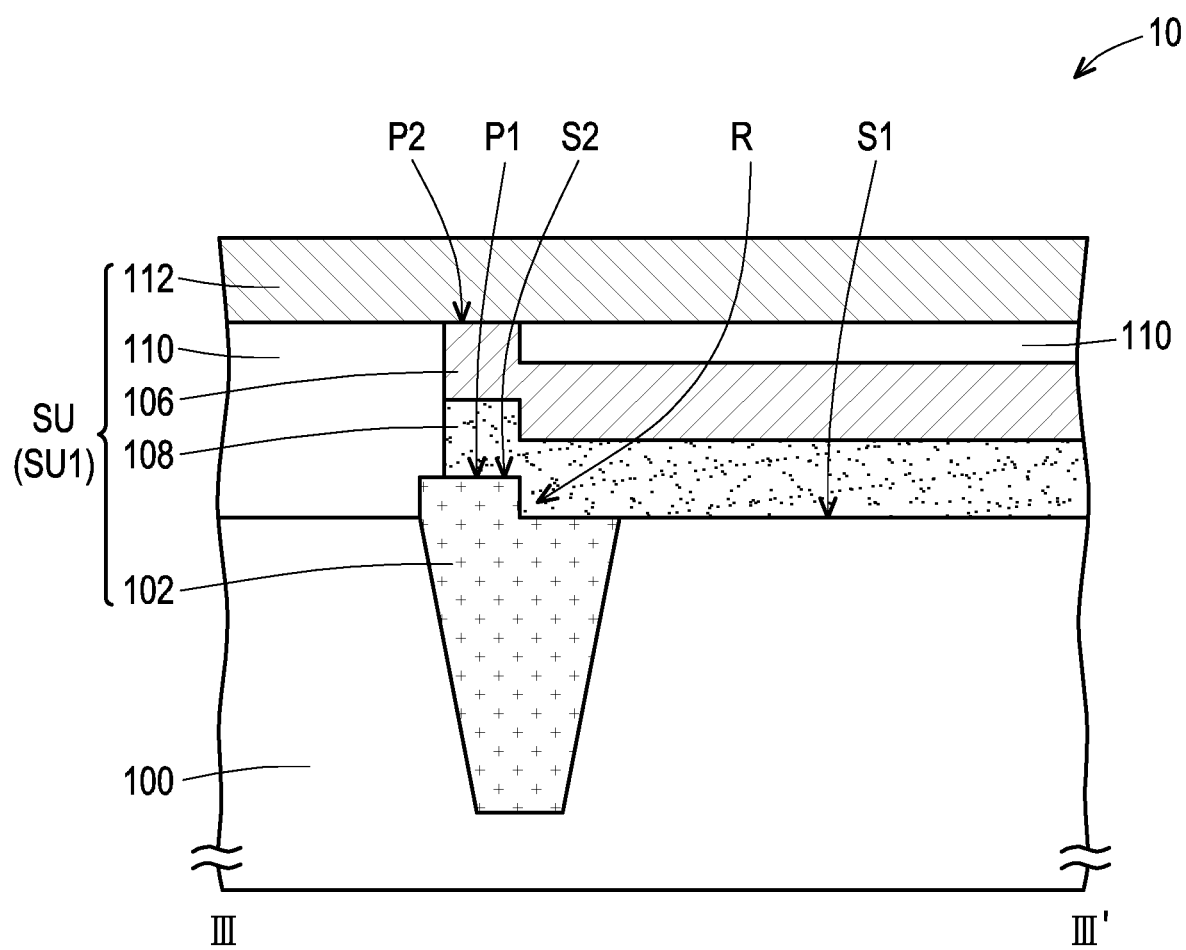
Figure 6D:
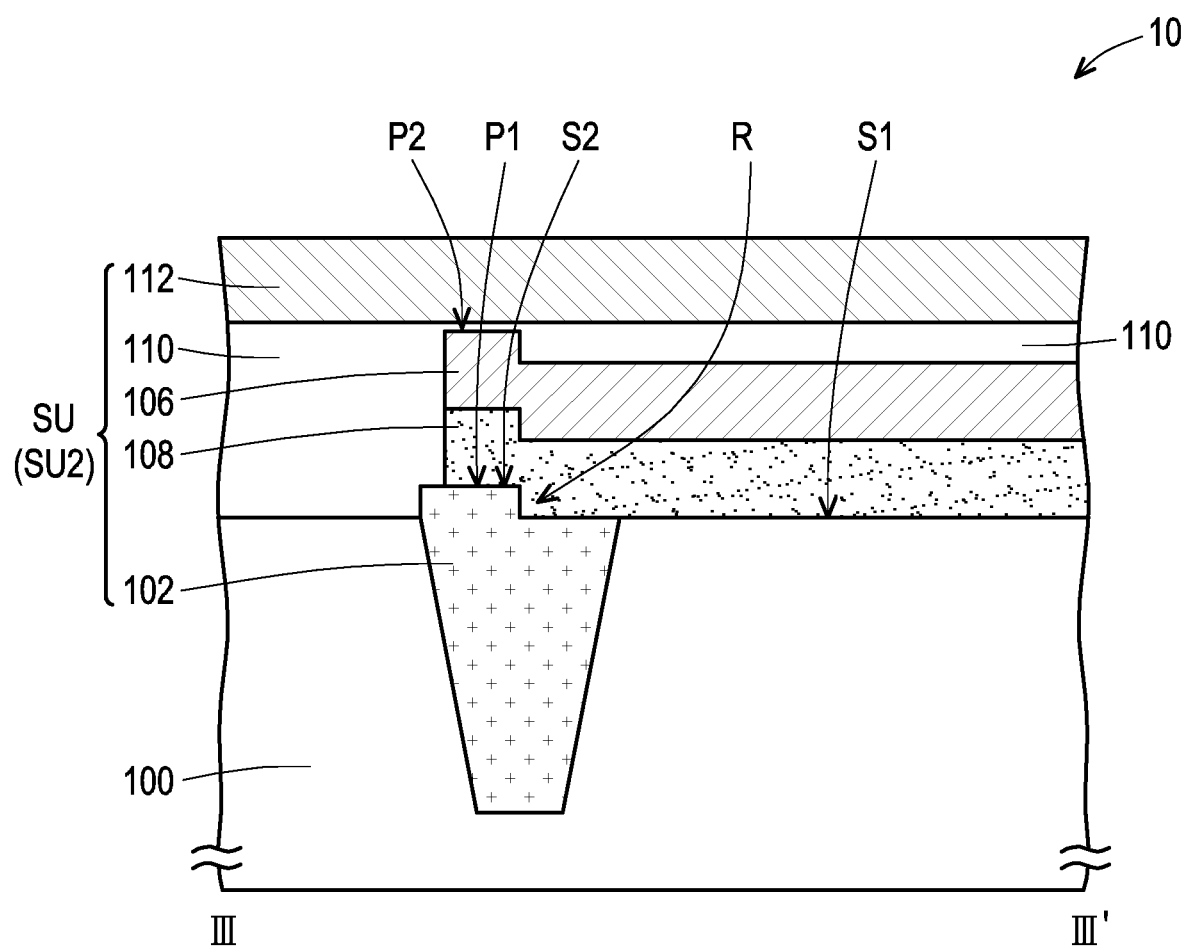
FIG. 6D is a cross-sectional view illustrating a PUF generator according to other embodiments of the invention.
Figure 7:
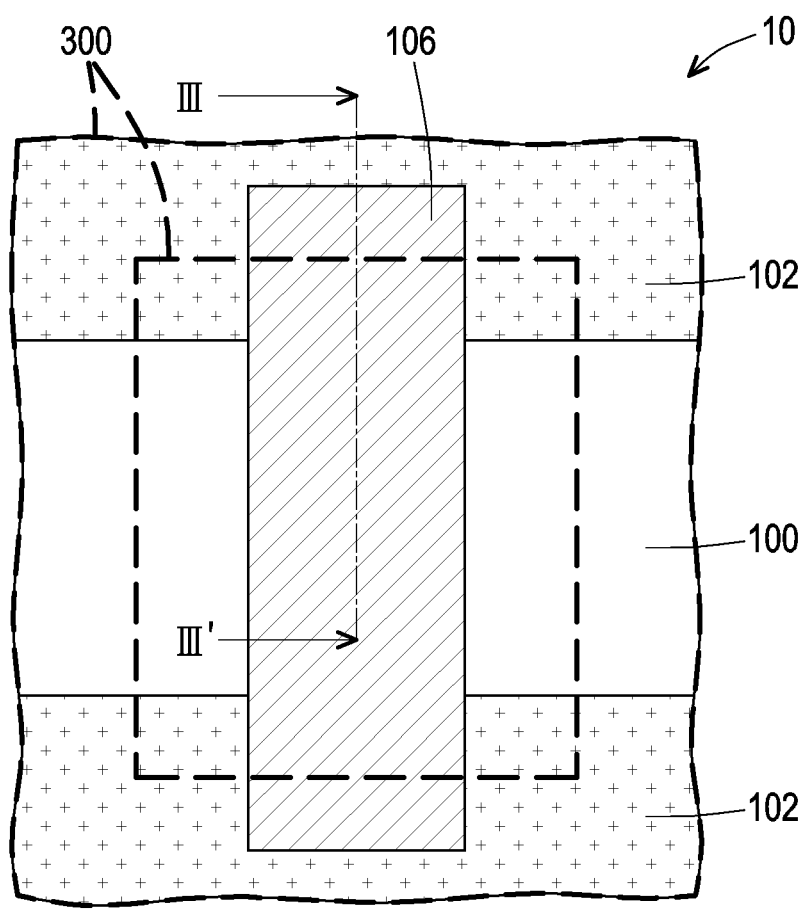
FIG. 7 is a top view illustrating a PUF generator according to other embodiments of the invention.

FIG. 6A to FIG. 6C are cross-sectional views illustrating a manufacturing process of a PUF generator according to other embodiments of the invention. FIG. 6D is a cross-sectional view illustrating a PUF generator according to other embodiments of the invention. FIG. 7 is a top view illustrating a PUF generator according to other embodiments of the invention. FIG. 6A to FIG. 6D are cross-sectional views taken along section line III-III' in FIG. 7. In the top view of the present embodiment, some components in the cross-sectional view are omitted to clearly illustrate the configuration relationship between the components in the top view.

Referring to FIG. 6A and FIG. 7, the structure as shown in FIG. 1A is provided. In addition, the structure of FIG. 1A and the manufacturing method thereof have been described in detail in the above embodiments, and the description thereof is not repeated here.

A patterned photoresist layer 300 may be formed on the isolation structure 102. The patterned photoresist layer 300 may expose a portion of the isolation structure 102. The method of forming the patterned photoresist layer 300 may include performing a lithography process.

An ion implantation process IP2 may be performed on the isolation structure 102 to form an implantation region R3 and a non-implantation region R4 in the isolation structure 102 by using the patterned photoresist layer 300 as a mask.

In the subsequent etching process for the isolation structure 102, the dopant in the implantation region R3 can make the etching rate of the isolation structure 102 in the implantation region R3 greater than the etching rate of the isolation structure 102 in the non-implantation region R4.

Referring to FIG. 6B and FIG. 7, the patterned photoresist layer 300 may be removed. The method of removing the patterned photoresist layer 300 is, for example, a dry stripping method or a wet stripping method.

An etching process may be performed on the isolation structure 102 to form a protrusion portion P1 and a recess R. In the etching process, the etching rate of the isolation structure 102 in the implantation region R3 (FIG. 6A) may be greater than the etching rate of the isolation structure 102 in the non-implantation region R4 (FIG. 6A). In some embodiments, the etching process is, for example, a wet etching process. For example, the isolation structure 102 may be etched by a buffered oxide etchant (BOE).

Referring to FIG. 6C, after forming the protrusion portion P1 and the recess R, steps as shown in FIG. 1E and FIG. 1F may be performed to form a semiconductor unit SU (e.g., semiconductor unit SU1), and the description thereof is not repeated here. In addition, other semiconductor unit SU (e.g., semiconductor unit SU2 in FIG. 6D) may be formed by the above method. That is, as shown in FIG. 6C, FIG. 6D, and FIG. 3, a plurality of semiconductor units SU may be formed by the above method, thereby forming a PUF generator 10. Moreover, the material, the arrangement, the forming method, and the effect of each component in the PUF generator 10 have been described in detail in the above embodiments, and the description thereof is not repeated here.

In summary, in the PUF generator and the manufacturing method thereof of the aforementioned embodiments, a random code can be generated by at least one short circuit randomly existing in at least one of the semiconductor units, thereby improving the reliability of the PUF generator and reducing the manufacturing cost of the PUF generator.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A physical unclonable function (PUF) generator, comprising:
   a substrate; and
   semiconductor units, wherein each of the semiconductor units comprises:
   an isolation structure located in the substrate and having a first protrusion portion and a recess, wherein the first protrusion portion and the recess are adjacent to each other;
   a first conductive line located above the first protrusion portion and the recess; and
   a second conductive line located above the first conductive line, wherein
   at least one short circuit randomly exists between at least one of the first conductive lines and at least one of the second conductive lines in at least one of the semiconductor units, and
   an entire bottom surface of the second conductive line is a flat surface.

2. The PUF generator according to claim 1, wherein the first conductive line is further located above a portion of a top surface of the substrate.

3. The PUF generator according to claim 1, wherein the first conductive line has a second protrusion portion, and the second protrusion portion is located directly above the first protrusion portion.

4. The PUF generator according to claim 3, wherein the second protrusion portion of the first conductive line short-circuited with the second conductive line is in direct contact with the second conductive line.

5. The PUF generator according to claim 1, wherein each of the semiconductor units further comprises:
   a dielectric layer located between the first conductive line and the isolation structure.

6. The PUF generator according to claim 1, wherein the first conductive lines in the semiconductor units are separated from each other.

7. The PUF generator according to claim 1, wherein the second conductive lines in the semiconductor units are separated from each other.

8. The PUF generator according to claim 1, wherein a top surface of the first protrusion portion is higher than a top surface of the substrate.

9. A manufacturing method of a PUF generator, comprising:
   providing a substrate; and
   forming semiconductor units, wherein each of the semiconductor units comprises:
   an isolation structure located in the substrate and having a first protrusion portion and a recess, wherein the first protrusion portion and the recess are adjacent to each other;
   a first conductive line located above the first protrusion portion and the recess; and
   a second conductive line located above the first conductive line, wherein
   at least one short circuit randomly exists between at least one of the first conductive lines and at least one of the second conductive lines in at least one of the semiconductor units, and
   an entire bottom surface of the second conductive line is a flat surface.

10. The manufacturing method of the PUF generator according to claim 9, wherein the first conductive line has a second protrusion portion, and the second protrusion portion is located directly above the first protrusion portion.

11. The manufacturing method of the PUF generator according to claim 9, wherein a method of forming the first protrusion portion and the recess comprises:
    forming a patterned mask layer on the isolation structure; and
    removing a portion of the isolation structure to form the first protrusion portion and the recess by using the patterned mask layer as a mask.

12. The manufacturing method of the PUF generator according to claim 11, wherein the patterned mask layer comprises a patterned hard mask layer or a patterned photoresist layer.

13. The manufacturing method of the PUF generator according to claim 12, wherein the patterned mask layer is the patterned hard mask layer, and a method of forming the patterned mask layer comprises performing a deposition process, a lithography process, and an etching process.

14. The manufacturing method of the PUF generator according to claim 12, wherein the patterned mask layer is the patterned photoresist layer, and a method of forming the patterned mask layer comprises performing a lithography process.

15. The manufacturing method of the PUF generator according to claim 11, wherein a method of removing the portion of the isolation structure comprises a wet etching method.

16. The manufacturing method of the PUF generator according to claim 9, wherein a method of forming the first protrusion portion and the recess comprises:
   forming a patterned photoresist layer on the isolation structure;
   performing an ion implantation process on the isolation structure to form an implantation region and a non-implantation region in the isolation structure by using the patterned photoresist layer as a mask;
   removing the patterned photoresist layer; and
   performing an etching process on the isolation structure to form the first protrusion portion and the recess, wherein in the etching process, an etching rate of the isolation structure in the implantation region is less than an etching rate of the isolation structure in the non-implantation region.

17. The manufacturing method of the PUF generator according to claim 16, wherein the etching process comprises a wet etching process.

18. The manufacturing method of the PUF generator according to claim 9, wherein a method of forming the first protrusion portion and the recess comprises:
   forming a patterned photoresist layer on the isolation structure;
   performing an ion implantation process on the isolation structure to form an implantation region and a non-implantation region in the isolation structure by using the patterned photoresist layer as a mask;
   removing the patterned photoresist layer; and
   performing an etching process on the isolation structure to form the first protrusion portion and the recess, wherein in the etching process, an etching rate of the isolation structure in the implantation region is greater than an etching rate of the isolation structure in the non-implantation region.

19. The manufacturing method of the PUF generator according to claim 18, wherein the etching process comprises a wet etching process.

20. The manufacturing method of the PUF generator according to claim 9, further comprising:
   forming a dielectric layer between the first conductive line and the isolation structure.

* * * * *